United States Patent
Wushour et al.

(10) Patent No.: US 10,432,805 B1
(45) Date of Patent: Oct. 1, 2019

(54) OPERATION OF A PANEL FOR A PRINTER USING A DIAL CONTROL

(71) Applicant: KYOCERA Document Solutions Inc., Chou-Ku, Osaka (JP)

(72) Inventors: Dilinur Wushour, Clayton, CA (US); Jacek Joseph Matysiak, Concord, CA (US)

(73) Assignee: KYOCERA Document Solutions, Inc., Osaka (JP)

( * ) Notice: Subject to any disclaimer, the term of this patent is extended or adjusted under 35 U.S.C. 154(b) by 0 days.

(21) Appl. No.: 16/100,814

(22) Filed: Aug. 10, 2018

(51) Int. Cl.
| H04N 1/00 | (2006.01) |
| G06F 3/0482 | (2013.01) |
| G06F 3/0488 | (2013.01) |
| G06F 3/0484 | (2013.01) |
| G06F 3/12 | (2006.01) |

(52) U.S. Cl.
CPC ....... *H04N 1/00397* (2013.01); *G06F 3/0482* (2013.01); *G06F 3/0488* (2013.01); *G06F 3/04845* (2013.01); *G06F 3/1201* (2013.01); *H04N 2201/0094* (2013.01)

(58) Field of Classification Search
CPC ........ H04N 1/00397; H04N 2201/0094; G06F 3/1201; G06F 3/04845; G06F 3/0482; G06F 3/0488

USPC .......................................................... 358/1.15
See application file for complete search history.

(56) References Cited

U.S. PATENT DOCUMENTS

| 4,627,707 | A | * | 12/1986 | Tani | ................ G03G 15/04018 335/4 |
| 6,546,188 | B1 | * | 4/2003 | Ishii | .................... G11B 27/031 386/280 |
| 7,126,583 | B1 | | 10/2006 | Breed | |
| 8,341,553 | B2 | | 12/2012 | Reed | |
| 8,482,535 | B2 | | 7/2013 | Pryor | |
| 9,774,754 | B2 | | 9/2017 | Yue | |
| 2010/0197353 | A1 | | 8/2010 | Marui | |

* cited by examiner

*Primary Examiner* — Tammy Paige Goddard
*Assistant Examiner* — Darryl V Dottin
(74) *Attorney, Agent, or Firm* — The Webostad Firm, a P.C.; W. Eric Webostad

(57) ABSTRACT

Apparatus(es) and method(s) relating to operation of a multi-function printer panel are disclosed. In such a method, a main menu is displayed on a display screen of the multi-function printer panel. A plurality of primary image items of the main menu displayed on the display screen are navigated responsive to a first movement of a dial control. The dial control is pressed to select a primary image item of the plurality of primary image items. A plurality of secondary image items displayed on the display screen associated with the primary image item selected are navigated responsive to a second movement of the dial control. The dial control is pressed to select a secondary image item of the plurality of secondary image items.

19 Claims, 11 Drawing Sheets

OPERATION OF A PANEL FOR A PRINTER USING A DIAL CONTROL

TECHNICAL FIELD

The following description relates to a printing device. More particularly, the following description relates to operation of a panel for a printer device using a dial control.

BACKGROUND

Content is displayed on display screens of various electronic devices, including printers, among other electronic devices. This content may include one or more images representing selectable functions and sub-functions thereof. In some instances, the number of functions and sub-functions may be significant, precluding displaying all of such functions and sub-functions at one time on a display, and so a hierarchical system of organization may be used. However, having multiple buttons associated with operation of such a hierarchical system can be confusing to a user.

SUMMARY

A method relates generally to operation of a multi-function printer panel. In such a method, a main menu is displayed on a display screen of the multi-function printer panel. A plurality of primary image items of the main menu displayed on the display screen are navigated responsive to a first movement of a dial control. The dial control is pressed to select a primary image item of the plurality of primary image items. A plurality of secondary image items displayed on the display screen associated with the primary image item selected are navigated responsive to a second movement of the dial control. The dial control is pressed to select a secondary image item of the plurality of secondary image items.

An apparatus relates generally to a multi-function printer. In such an apparatus, a multi-function printer panel has a display screen and a dial control. The display screen is configured to display a main menu responsive to pressing of a dial control of the multi-function printer panel. The dial control is configured for navigating a plurality of primary image items of the main menu displayed on the display screen responsive to a first movement of the dial control. The dial control is configured for selecting a primary image item of the plurality of primary image items responsive to a depressing down of the dial control. The dial control is configured for navigating a plurality of secondary image items displayed on the display screen associated with the primary image item selected responsive to a second movement with respect to the dial control. The dial control is configured for selecting a secondary image item of the plurality of secondary image items responsive to a pressing down on the dial control.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 1-2 is a block/pictorial diagram depicting another example of a printer/multi-function printer panel.

FIG. 1-3 is the block/pictorial diagram of FIG. 1-1 depicting another example of the printer/multi-function printer panel of FIG. 1-1 with a different dial control.

FIG. 1-4 is the block/pictorial diagram of FIG. 1-2 depicting another example of the printer/multi-function printer panel of FIG. 1-2 with a different dial control.

FIG. 2 is a flow diagram depicting an example multi-function printer panel process.

FIG. 3-1 is the block/pictorial diagram of FIG. 1-3 depicting an example of the panel of FIG. 1-3 with a copy submenu displayed.

FIG. 3-2 is the block/pictorial diagram of FIG. 1-3 depicting an example of the panel of FIG. 1-3 with a scan submenu displayed.

FIG. 4-1 is the block/pictorial diagram of FIG. 1-3 depicting with an example of a scan page for a zoom function.

FIG. 4-2 is the block/pictorial diagram of FIG. 4-1 depicting an example of a scan page for a scan size function.

FIG. 4-3 is the block/pictorial diagram of FIG. 4-2 depicting an example of a scan page with a subpage for a scan size function.

FIG. 4-4 is the block/pictorial diagram of FIG. 4-2 depicting an example of another scan page 400 for a scan size function.

FIG. 4-5 is the block/pictorial diagram of FIG. 4-4 depicting an example of yet another scan page for a scan size function.

FIG. 5 is a flow diagram depicting the multi-function printer panel process of FIG. 2 with an example modification for selection of an image item of a page of a submenu.

DETAILED DESCRIPTION

Figure 1:
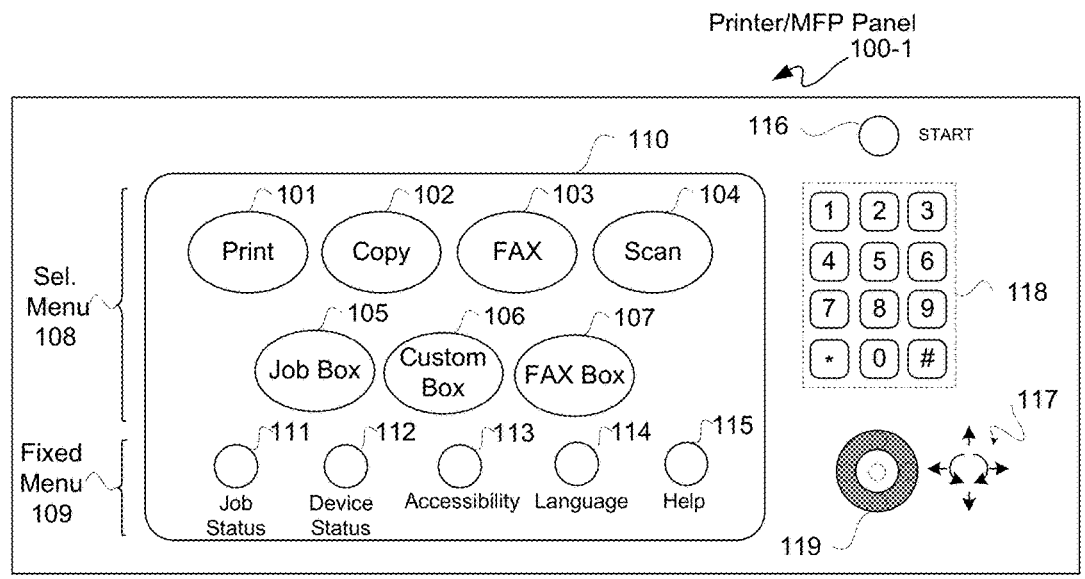
FIG. 1-1 is a block/pictorial diagram depicting an example of a printer/multi-function printer panel.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, the order of these operations may differ from what is depicted. Also two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

Before describing the examples illustratively depicted in the several figures, a general introduction is provided to further understanding.

Many functions of a device, such as a printer, or more particularly a multi-function printer, are effectively embedded within software used to operate such device. In order to provide access to such functions, while providing a consistent and less complex interface, a dial control is described below. A dial control provides access to many functions, including without limitation context specific functions, with a consistent interface. This avoids having to have buttons or button sequences for each operation. A dial control facilitates navigation through a menu of functions, selecting a function from such menu, and selecting one or more sub-functions of such a selected function. Accordingly, functions and sub-functions may change; however, use of a dial control interface is consistent. This consistency of usage with a dial control facilitates familiarity for scrolling through and selecting functions and sub-functions.

With the above general understanding borne in mind, various configurations for a dial control of a printer/multi-function printer panel are generally described below.

FIG. 1-1 is a block/pictorial diagram depicting an example of a printer/multi-function printer panel ("panel") 100-1. In this example, panel 100-1 includes a touch-sensitive input ("touch") screen 110, a start button 116, a numeric keypad 118, and a dial control 119. In this example, an electronic dial control 119 is a click wheel 119.

Touch screen 110 may be used for displaying a selectable menu 108 having button icons or images associated therewith. Such button icons may be associated with functions for example for operation of a printer/multi-function printer having panel 100-1. In this example, a main menu 108 is depicted as displayed on touch screen 110 with touch-screen selectable button icons 101 through 107 for a selectable menu 108. In this example, main menu 108 includes a display of a print button icon 101, a copy button icon 102, a fax button icon 103, a scan button icon 104, a job box button icon 105, a custom box button icon 106, and a fax box button icon 107. However, a menu, other than main menu 108, may be displayed as a selectable menu 108 on touch screen 110.

Touch screen 110 may further be used for displaying a static or fixed menu 109 having touch selectable button icons associated with a status or related state of a printer/multi-function printer having panel 100-1. In this example, fixed menu 109 includes a display of a job status button icon 111, a device status button icon 112, an accessibility button icon 113, a language icon button 114, and a help button icon 115.

A key 117 for operation of click wheel 119 may be present on panel 100-1. Key 117 may indicate that click wheel 119 may be used to sense a clockwise rotation or a counter-clockwise rotation by sliding a finger or other digit around a touch-sensitive ring thereof. An up click, a down click, a right click, or a left click may be used with mechanical buttons, as generally indicated with respective dashed circles, below such a touch-sensitive ring of click wheel 119. A central mechanical button, as generally indicated with a dashed circle, may be used as a select button of click wheel 119. As click wheels 119 are well-known, click wheel 119 is not described in unnecessary detail.

Figures 1, 2:
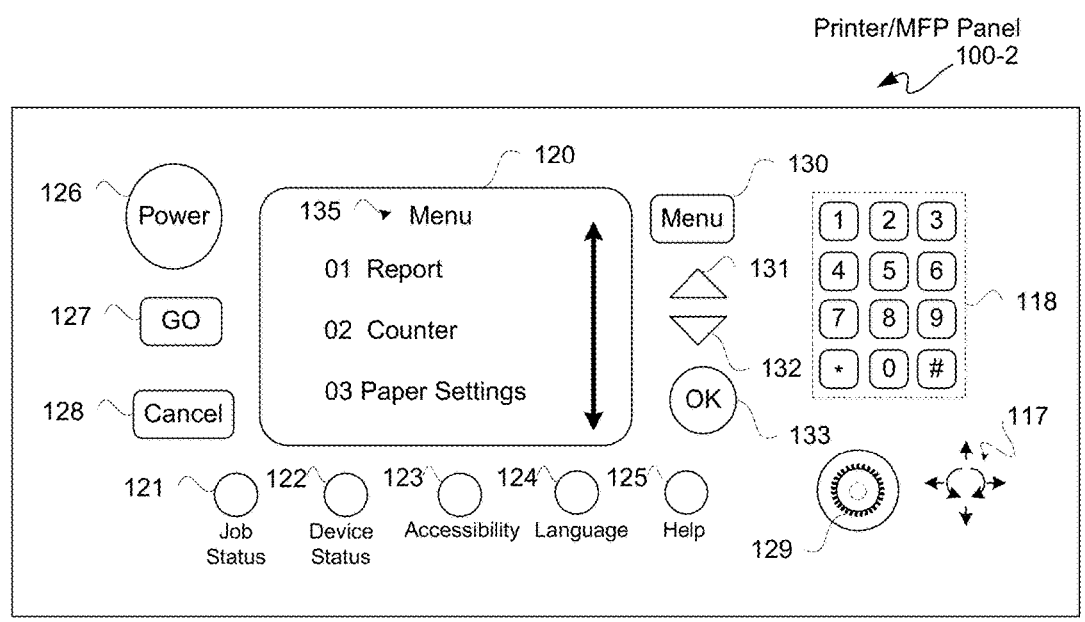

FIG. 1-2 is a block/pictorial diagram depicting another example of a printer/multi-function printer panel ("panel") 100-2. In this example, panel 100-2 includes a display screen 120 which is not a touch screen. In this example, panel 100-2 includes mechanical buttons 121-125, a mechanical power button 126, a numeric keypad 118, a mechanical "go" button 127, a mechanical cancel button 128, a mechanical menu button 130, an mechanical up arrow button 131, a mechanical down arrow button 132, an mechanical okay ("OK") or select button 133, and a dial control 129. In this example, dial control 129 is a circular or circular-like interface knob 129 same or similar to an automobile Multi Media Interface ("MMI") knob. Mechanical buttons 121 through 125 correspond to above-described touch screen buttons 111 through 115, though for mechanical buttons rather than touch screen button icons.

Display screen 120 may be used for displaying a selectable menu 108 having a list of scrollable menu items associated therewith. Such menu items may be associated with functions for example for operation of a printer/multi-function printer having panel 100-2. In this example, a portion of a submenu 135 is depicted as displayed on display screen 120. However, a submenu, other than submenu 135, may be displayed for scrollable selectable menu items either through mechanical buttons, such as mechanical buttons 130 through 133, or through electro-mechanical circular interface knob 129.

A key 117 for operation of electro-mechanical circular interface knob 129 may be present on panel 100-2. Key 117 may indicate that circular interface knob 129 may be used to sense a clockwise rotation or a counterclockwise rotation by sliding a finger or other digit around a touch-sensitive ring thereof. As circular interface knob 129 is well-known, circular interface knob 129 is not described in unnecessary detail.

Figures 1, 2, 3:
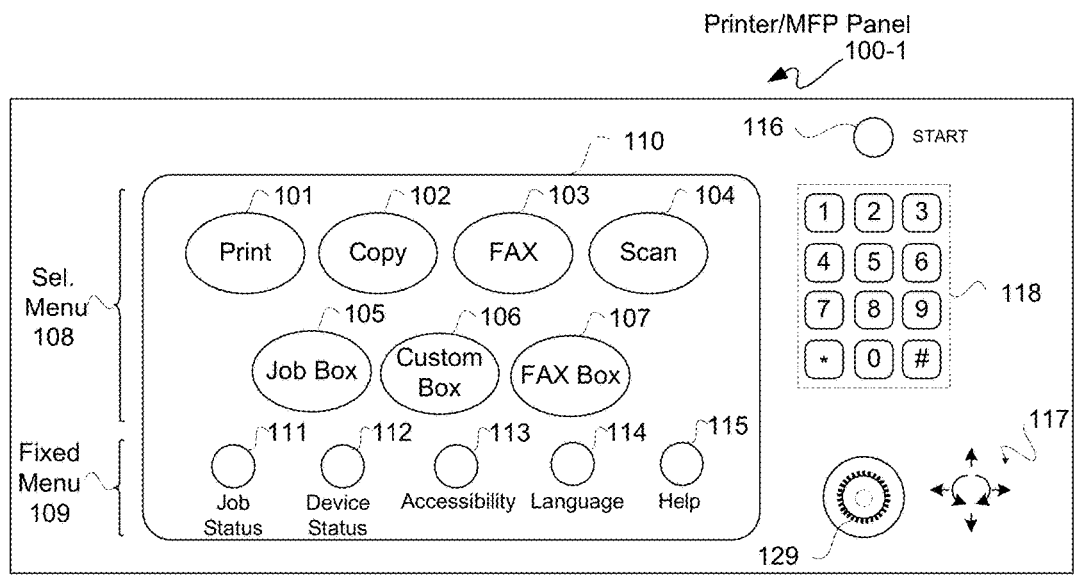

FIG. 1-3 is the block/pictorial diagram of FIG. 1-1 depicting another example of a printer/multi-function printer panel ("panel") 100-1, though in this example with a dial control 129 instead of dial control 119. FIG. 1-4 is the block/pictorial diagram of FIG. 1-2 depicting another example of a printer/multi-function printer panel ("panel") 100-2, though in this example with a dial control 119 instead of dial control 129.

For purposes of clarity by way of example and not limitation, the following description is in terms of a panel 100-1 having a dial control 119 or 129 and/or a panel 100-2 having a dial control 119 or 129.

FIG. 2 is a flow diagram depicting an example multi-function printer panel process 200, such as for a multi-function printer. Multi-function printer panel process 200 is described with additional reference to FIGS. 1-1 through 1-4.

At operation 201, a multi-function printer panel, such as a panel 100-1 or 100-2 (hereinafter generally panel 100), may be used for operating or putting into operation by depressing a mechanical start or power button on a printer or multi-function printer ("MFP"). At operation 202, use of a dial control of a panel 100 over mechanical buttons of such panel may be selected. This selection may be a displayed option on touch screen 110 or display screen 120, or may be invoked with use of click wheel 119 or circular interface knob 129. For purposes of clarity without loss of generality, click wheel 119 or circular interface knob 129 is hereinafter referred to as dial control 119/129 to refer to either or both.

If operation by way of mechanical buttons over dial control 119/129 is selected at operation 202, then normal operation with use of mechanical buttons and/or touch screen buttons may be performed as generally indicated at operation 203. If, however, operation by way of dial control 119/129 is selected at operation 202, then at operation 204 dial control 119/129 may be pressed or depressed to display a main menu on touch screen 110 or display screen 120, as applicable. For purposes of clarity by way of example without loss of generality, a display screen 110/120 is used to refer to either or both touch screen 110 or display screen 120, as a touch screen 110 includes a display screen.

At operation 205, navigation using dial control 119/129 through a plurality of primary image items of a menu, such as for example a main menu or a submenu, displayed on a display screen 110/120 may be performed responsive to a rotational movement of such a dial control 119/129. At operation 206, after navigating to a user selectable primary image item of such plurality of primary image items of a menu, such a primary image item of such plurality may be selected by pressing or depressing dial control 119/129.

At operation 207, a user may decide to return or go back to a previous menu, which may be a main menu or a submenu. If at operation 207, a user decides to navigate to a previous menu, at operation 208, dial control 119/129 may be slid or shifted in an upward or up direction to display such a previous menu.

After returning to a previous menu at operation 208, operation 205 may be repeated. If, however, at operation 207 a user decides to progress to a next or submenu level, then at operation 209 dial control 119/129 may be slid or shifted in a downward or down direction to go to a submenu.

After selection of a submenu at operation 205, movement of dial control 119/129 at operation 205 may be to navigate through options displayed for a next or submenu identified at operation 209. This navigating may be to display a plurality of secondary or tertiary image items on a display screen 110/120 associated with a primary or secondary image item selected at a previous operation of loop 211 responsive to navigation by way of movement of dial control 119/129.

At a subsequent instance of operation 206 of loop 211, dial control 119/129 may be pressed or depressed to select a secondary or tertiary image item of a plurality of secondary or tertiary image items with reference to a primary or secondary image item, respectively, selected at a previous instance of operation 206 in loop 211. Along those lines, for example, a dial control 119/129 may be slid or shifted in a first direction to return to a main menu at operation 208 or slid or shifted in a second direction different from such first direction to select a sub-menu screen image at operation 209. Such sliding or shifting may be for displaying items on a display screen 110/120 associated with a secondary image item selected at an instance of operation 206 around loop 211.

For a dial control 129, such first and second movements may respectively include first and second rotational movements of a circular interface knob. Moreover, such a circular interface knob 129 may include a joystick control, such as a joystick interface knob for such circular interface knob. However, for dial control 119, such first and second movements may respectively include first and second detected sliding movements along a surface of such a click wheel.

In order to more concretely understand applications of the above-described technology, some use examples are provided. While any of panels 100 of FIGS. 1-1 through 1-4 may be used in the following examples, panel 100-1 of FIG. 1-3 having a dial control 129 is described for purposes of clarity by way of example and not limitation. Along those lines, FIG. 3-1 is the block/pictorial diagram of FIG. 1-3 depicting an example of a panel 100-1 with a copy submenu 310 having been selected from a copy button icon 102 of a main menu 108. After navigating to a copy button icon 102 such as by rotation of dial control 129, such copy button icon 102 may be selected by pressing down on a central region of dial control 129. Such a copy submenu 310 may then be displayed. A shift of dial control 129 up may be used to return to main menu 108, and a shift of dial control 129 down may be used to shift down into fixed menu 109 image items.

With copy submenu 310 displayed, each of selectable copy image items 301 through 307 may be respectively selected by rotating dial control 129 to a copy image item to be selected, and while on, such as highlighting, a copy image item of selectable copy image items 301 through 307, such a copy image item may be selected by pressing down on a central region of dial control 129 to select same. A start button, mechanical or image item, may subsequently be pressed or selected to initiate copying.

FIG. 3-2 is the block/pictorial diagram of FIG. 1-3 depicting an example of a panel 100-1 with a scan submenu 320 selected from a scan button icon 104 of a main menu 108. After navigating to a scan button icon 104 such as by rotation of dial control 129, such scan button icon 104, as a primary image item, may be selected by pressing down on a central region of dial control 129. Such a scan submenu 320 may then be displayed. A shift of dial control 129 up may be used to return to main menu 108, and a shift of dial control 129 down may be used to shift down into fixed menu 109 image items.

With scan submenu 320 displayed, each of selectable scan image items 311 through 318 may be respectively selected by rotating dial control 129 to a scan image item, to be selected, and while on, such as highlighting, a scan image item of selectable scan image items 311 through 318, such a scan image item may be selected by pressing down on a central region of dial control 129 to select same. A start button may subsequently be pressed or selected to initiate scanning.

However, scanning may be affected by one or more secondary image items selected, such as of scanning image items 311 through 318. For example, assuming a zoom image item 318 is selected, a scan preview screen may be displayed.

Figures 1, 2, 3, 4:
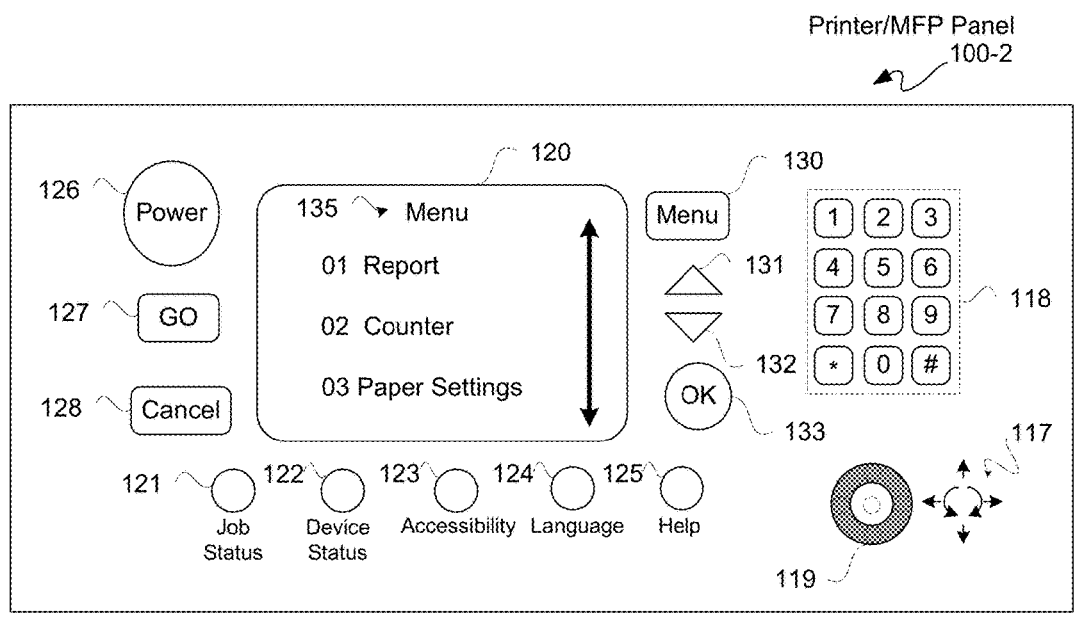
Figure 2:
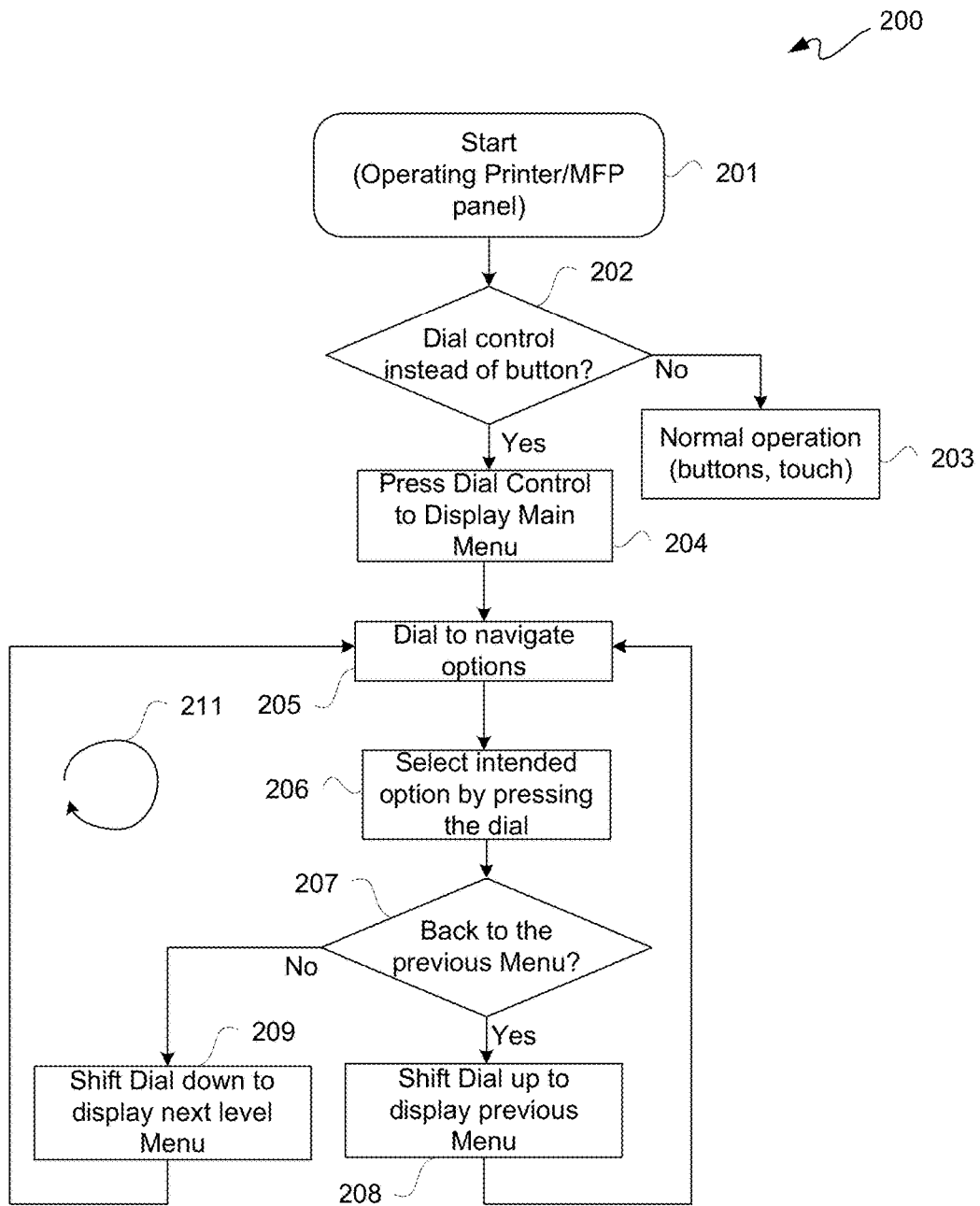
Figures 1, 3:
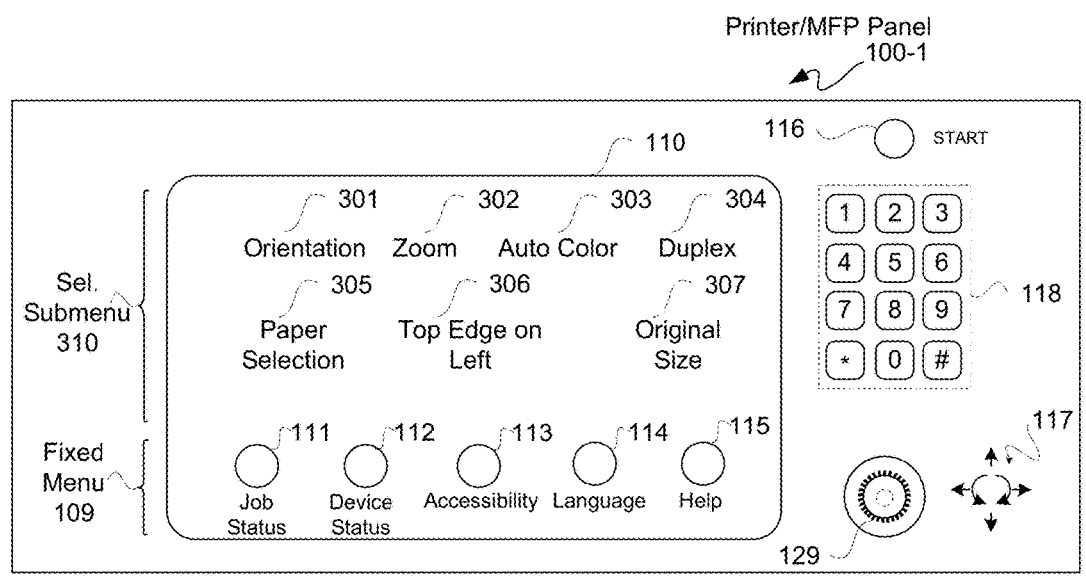
Figures 2, 3:
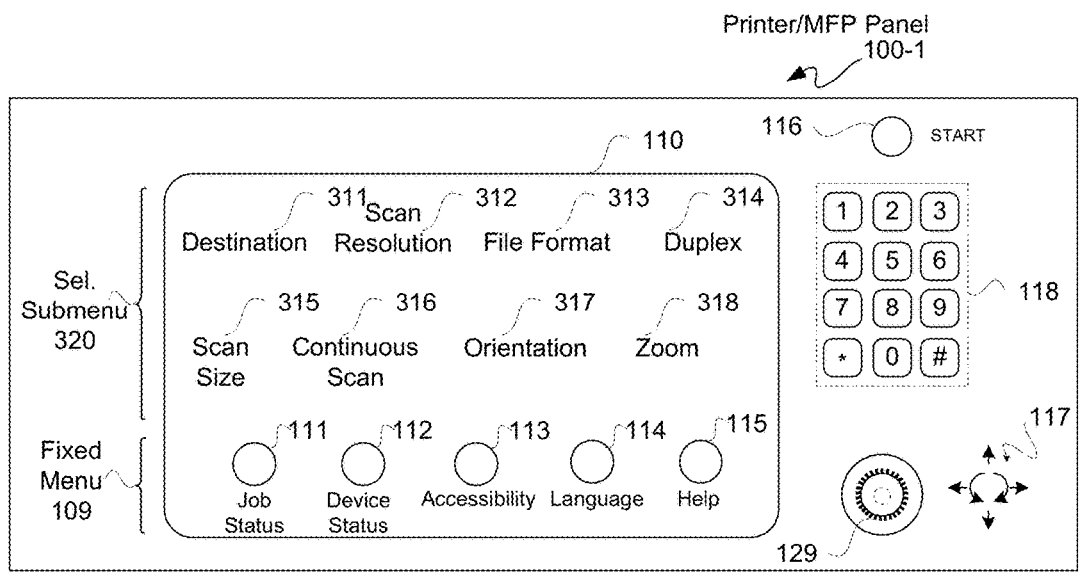

FIG. 4-1 is the block/pictorial diagram of FIG. 1-3 depicting a panel 100-1 with an example of a scan page 400 having been selected from a zoom image item 318 of a scan submenu 320. A scan page 400 may be displayed, such as for example on a display screen 110, with or without fixed menu 109 items.

Figures 1, 4:
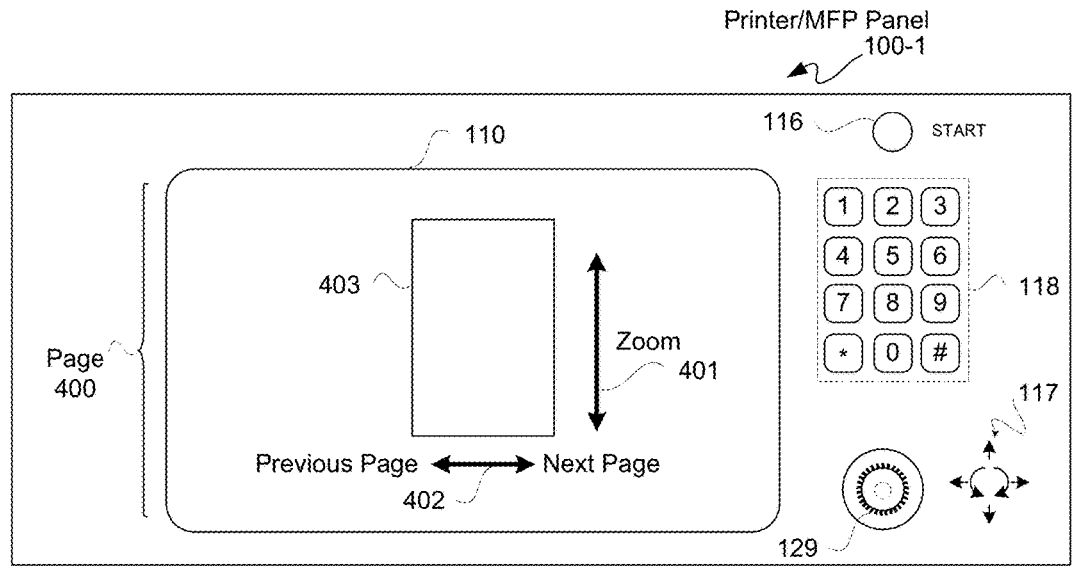
Figures 2, 4:
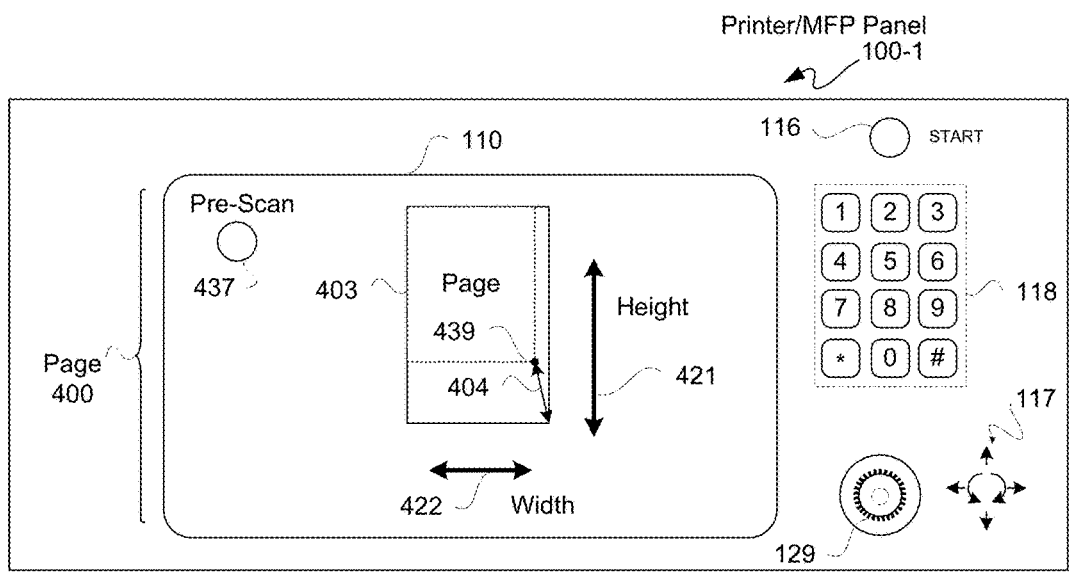
Figures 3, 4:
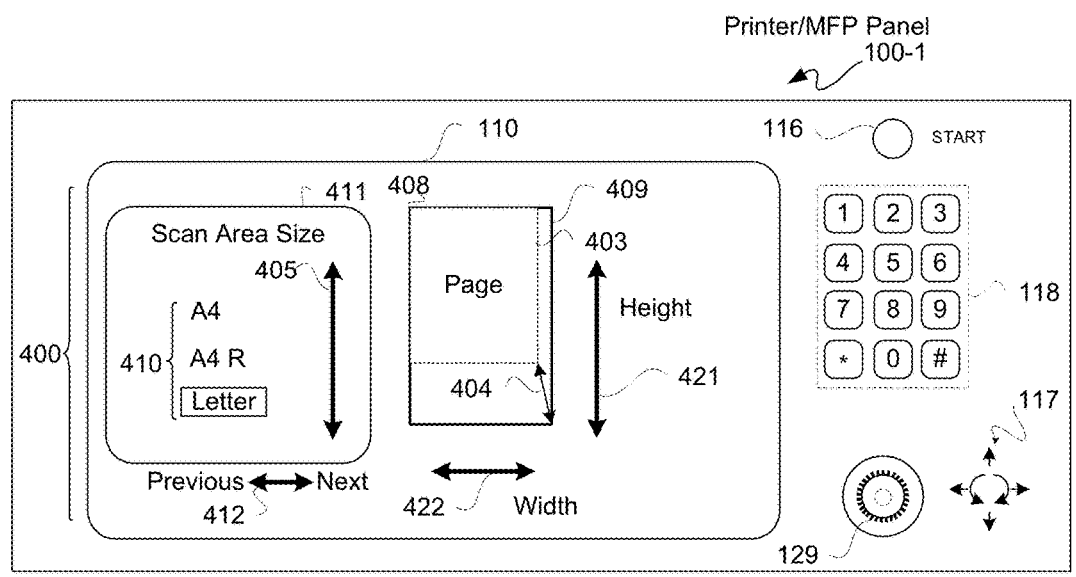
Figures 4, 5:
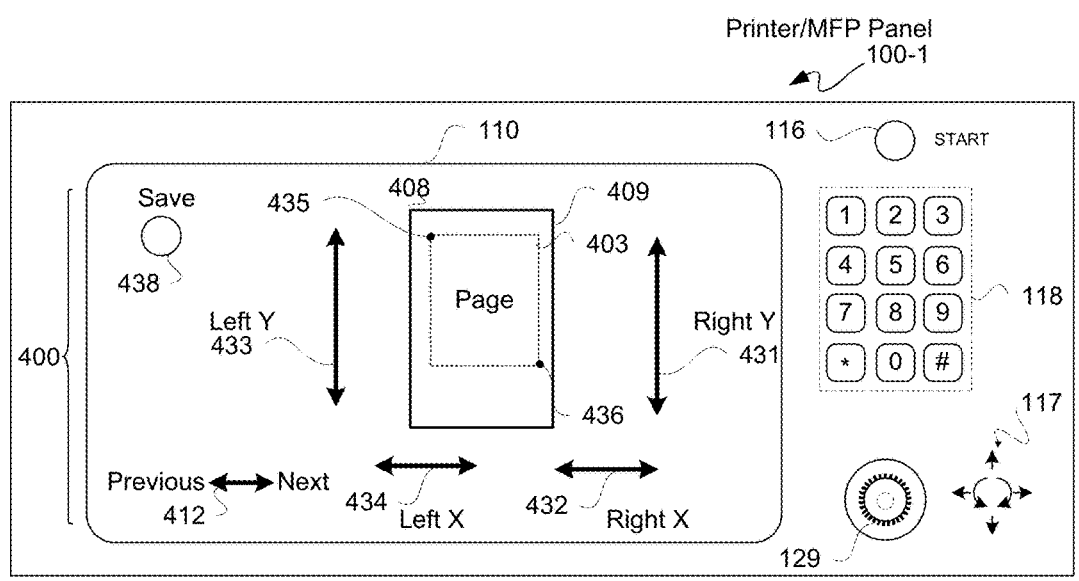
Figure 5:
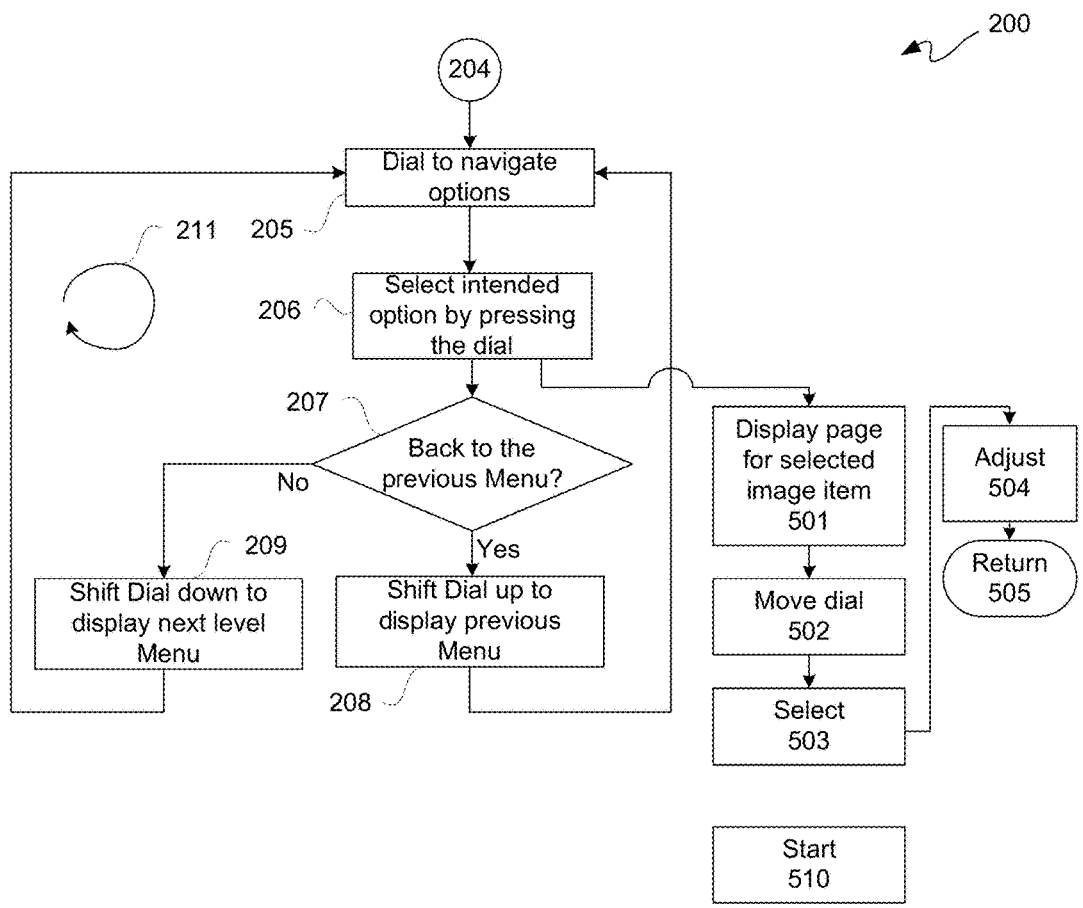

FIG. 5 is a flow diagram depicting multi-function printer panel process 200 of FIG. 2 with an example modification for selection of an image item of a page of a submenu. With simultaneous reference to FIGS. 4-1 and 5, modified multi-function printer panel process 200 is described along with scan page 400.

In an iteration of loop 211 for a scan submenu 320 selection, at operation 206, a user may press dial control 129 to select an image item of a submenu causing process 200 to branch to display at operation 501 a page 400 associated with such a selected image item on display screen 110. In this example, page 400 is a scan page 400; however, in another example, a page for a different image item of a submenu may be used.

In response to selection of an image item on a submenu, modified multi-function printer panel process 200 may branch to operation 501 to display a page 400 for a selected image item. At operation 502, a dial control 129 may be moved, such as rotation of a knob thereof in a clockwise or counterclockwise direction to zoom in or out, respectively, to navigate to an arrow image 401 or 402. However, in a click wheel example, navigating to a zoom arrow image may include sensing a tactile sliding movement along a surface of a click wheel at operation 502.

A vertical zoom arrow image 401 or horizontal next/previous page arrow image 402 displayed may be selected by moving dial control 129 at operation 502 to navigate to such an arrow image displayed on a display screen 110, and then at operation 503 selecting such an arrow image by pressing down on a central region of dial control 129 to select such an arrow image displayed. For selection of a vertical zoom arrow image 401 at operation 503, dial control 129 may be shifted in a first or a second direction opposite the first direction, such as up or down in this example, to zoom in or out, respectively, to adjust at operation 504 what is displayed on a previewed page 403. For selection of a horizontal next/previous page arrow image 402 at operation 503, dial control 129 may be shifted in a first or a second direction opposite the first direction, such as right or left in this example, to preview a next page or a previous page, respectively, to adjust at operation 504 what is displayed for a previewed page 403. At return operation 505, multi-function printer panel process 200 may return to operation 206.

Once a user is ready to scan, a start button 116 may be pressed to start scanning at operation 510.

FIG. 4-2, which is the block/pictorial diagram of FIG. 4-1 depicting a panel 100-1 with an example of a scan page 400 having been selected from a scan size item 315 of a scan submenu 320. FIG. 4-2 is further described with additional reference to FIG. 5. For a primary and a secondary image item respectively being a scan image item and a scan size item, dimensions of a to be scanned portion of previewed page 403 may be adjusted at 504. Such primary and secondary image items may be respectively selected by a user at corresponding iterations of operation 206 of loop 211.

Operations 501 through 505 are the same as described above, except arrow images 401 or 402 respectively are a scan height adjustment image arrow 421 and a scan width adjustment image arrow 422. Thus, rather than zooming in or out, scan height may be adjusted up or down, as generally indicated by arrow 404. Furthermore, rather than going to a previous page or a next page, scan width may be adjusted right or left, also as generally indicated by arrow 404.

Along those lines, scan width adjustment image arrow 422 may be selected with dial control 129 to move an index ("dot") 439 left or right by shifting dial control 129 left or right. Likewise, scan height adjustment image arrow 421 may be selected with dial control 129 to move dot 439 up or down by shifting dial control 129 up or down. Optionally, a pre-scan button 437 may be selected to obtain a low resolution scan for a preview page 403 with one or more adjusted boundary settings.

FIG. 4-3 is the block/pictorial diagram of FIG. 4-2 depicting a panel 100-1 with an example of a scan page 400 with a subpage 411 selected from a scan size item 315 of a scan submenu 320. FIG. 4-3 is further described with additional reference to FIG. 5. For a primary and a secondary image item respectively being a scan image item and a scan size item, dimensions of a to be scanned portion of previewed page 403 may be selected at operation 503 from a list 410 of a scan area size subpage 411 displayed within page 400 displayed at operation 501. Such primary and secondary image items may be respectively selected at corresponding iterations of operation 206 of loop 211.

At operation 501, a scan page 400 with a subpage 411 may be displayed on display screen 110. Subpage 411 may include a list 410 of predetermined sizes for scanning. In this example, a letter size is generally indicated as being selected or ready for selection; however, any of a variety of predetermined sizes may be selected.

In another example, scan page 400 is displayed on display screen 110 with a predefined list 410 of scan area sizes for selection responsive to size of a document placed on a platen of a multi-function printer having panel 100-1. An auto-determining pass using a low dpi may automatically be performed in order for an MFP to attempt to find boundaries or dimensions of a document so placed relative to dimensions of a platen.

At 501, a low-dpi preview image 403 may be displayed with a proposed boundary against platen dimensions of a platen rectangle image 409. Page 403 in this example is indexed to an uppermost, leftmost corner origin 408 of platen rectangle image 409. However, an origin 408 for indexing a document or page may be selected by rotating dial control 129 to origin 408 at an operation 502, selecting such origin 408 by pressing down on a central region of dial control 129 at operation 503, and then adjusting position of origin 408 at operation 504. Adjustment of position of origin 408 may be made by shifting dial control 129 up or down or left or right.

At another iteration of operation 502, dial control 129 may be moved to modify a scan boundary of page 403 by selecting the (width) bottom horizontal left/right control or the (height) vertical top/bottom control on the right, as previously described.

For scrolling through predetermined sizes of list 410, subpage 411 may include a scroll arrow. At another iteration of operation 502, dial control 129 may be rotated to move to scan area size subpage 411 for scrolling through list 410 using optional up/down arrow 405. At operation 502, a shift up or down of dial control 129 may be used for scrolling through list 410. At operation 503, a predetermined size in list 410 may be selected by pressing down on dial control 129. After selecting a predetermined size, a scan boundary of such predetermined size selected may be adjusted at operation 504, as previously described. At return operation 505, multi-function printer panel process 200 may return to operation 206.

A previous/next arrow image 412 may be navigated to, selected and operated as previously stated with reference to previous/next arrow image 402. Previous/next arrow image 412 may be used to navigate through multiple pages of a document for example, whether such pages are placed by hand on a platen or scanned using an automatic document feeder ("ADF").

Once a user is ready to scan, a start button 116 may be pressed to start scanning at operation 510.

FIG. 4-4 is the block/pictorial diagram of FIG. 4-2 depicting a panel 100-1 with an example of another scan page 400 selected from a scan size item 315 of a scan submenu 320. FIG. 4-5 is the block/pictorial diagram of FIG. 4-4 depicting a panel 100-1 with an example of yet another scan page 400 selected from a scan size item 315 of a scan submenu 320. The difference between panels 100-1 of FIGS. 4-4 and 4-5 is the former has a pre-scan button image 437, and the latter instead of a pre-scan button image 437 has a save button image 438. For example, after boundaries have been adjusted, a save button image may be selected to initiate scanning.

Figure 6:
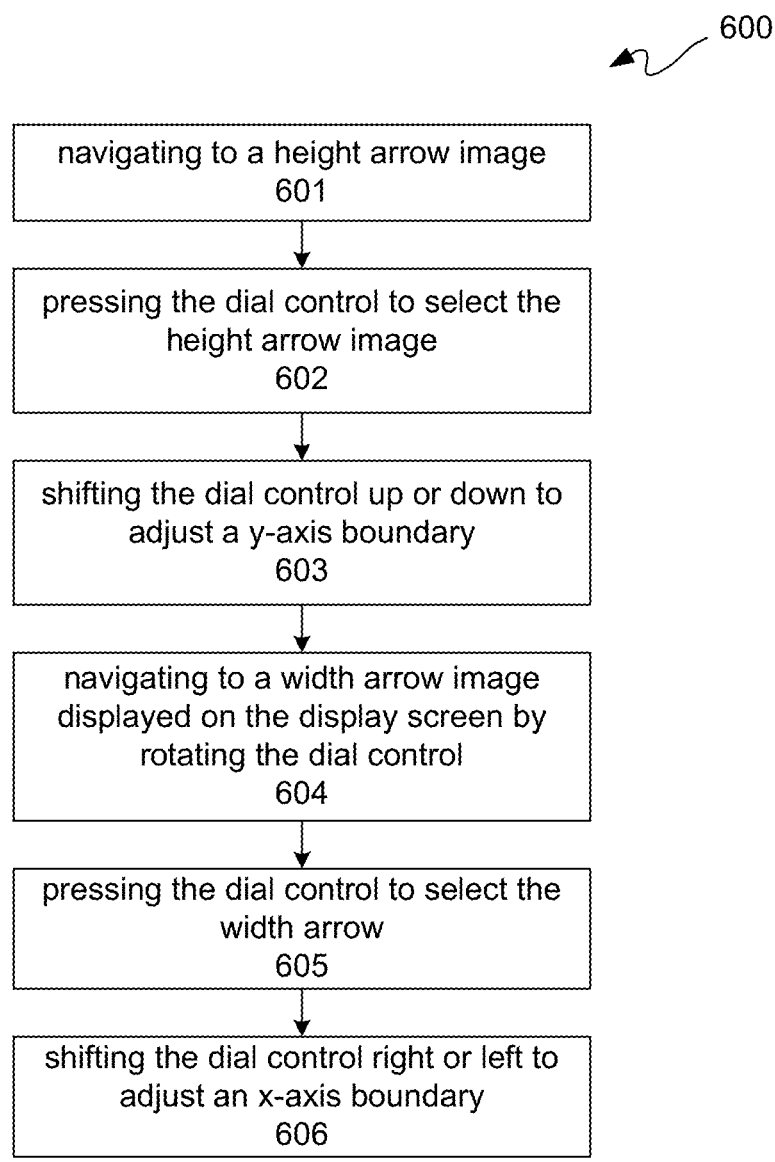
FIG. 6 is a flow diagram depicting an example boundary adjustment flow.

FIG. 6 is a flow diagram depicting an example boundary adjustment flow 600. Boundary adjustment flow 600 may be used for adjusting scan boundaries by use of a dial control 129 in conjunction with scan page 400 of FIG. 4-4 or 4-5 for a scanning operation. Along those lines for purposes of clarity and not limitation, boundary adjustment flow 600 is described with simultaneous reference to FIGS. 4-4, 4-5 and 6. However, as much of this description is a repeat of the description of FIGS. 4-2 and 5, such description is not repeated for purposes of clarity and not limitation.

In this example, width arrow 422 is replaced by left x-axis arrow 434 and right x-axis arrow 432 for independently moving left dot 435 and right dot 436, respectively, right or left with reference to adjusting left or right width boundaries of page 403, respectively. Similarly, in this example, height arrow 421 is replaced by left y-axis arrow 433 and right y-axis arrow 431 for independently moving left dot 435 and right dot 436, respectively, up or down with reference to adjusting top or bottom height boundaries of page 403, respectively.

At operation 601, a user may rotate dial control 129 to navigate to a y-axis arrow image 431 or 433 displayed on display screen 110. At operation 602, a user may select such y-axis arrow image by pressing down on a central region dial control 129.

At operation 603, a user may adjust a y-axis position of a dot 435 or 436 corresponding to a selected arrow image at operation 602. This adjustment at operation 603 may be performed by shifting dial control 129 up or down to move a vertical scan, or y-axis, boundary of page 403 displayed.

At operation 604, a user may navigate to an x-axis arrow image 432 or 434 displayed on display screen 110 by rotating dial control 129. At operation 605, a user may select such an x-axis arrow image by depressing a central region of dial control 129.

At operation 606, a user may adjust an x-axis position of a dot 435 or 436 corresponding to a selected arrow image at operation 605. This adjustment at operation 606 may be performed by shifting dial control 129 left or right to move a horizontal scan, or x-axis, boundary of page 403 displayed.

Accordingly, it should be appreciated that a user may adjust a right and/or a left y-axis position independently of one another. It should further be appreciated that a user may adjust a right and/or a left x-axis position independently of one another.

Figure 7:
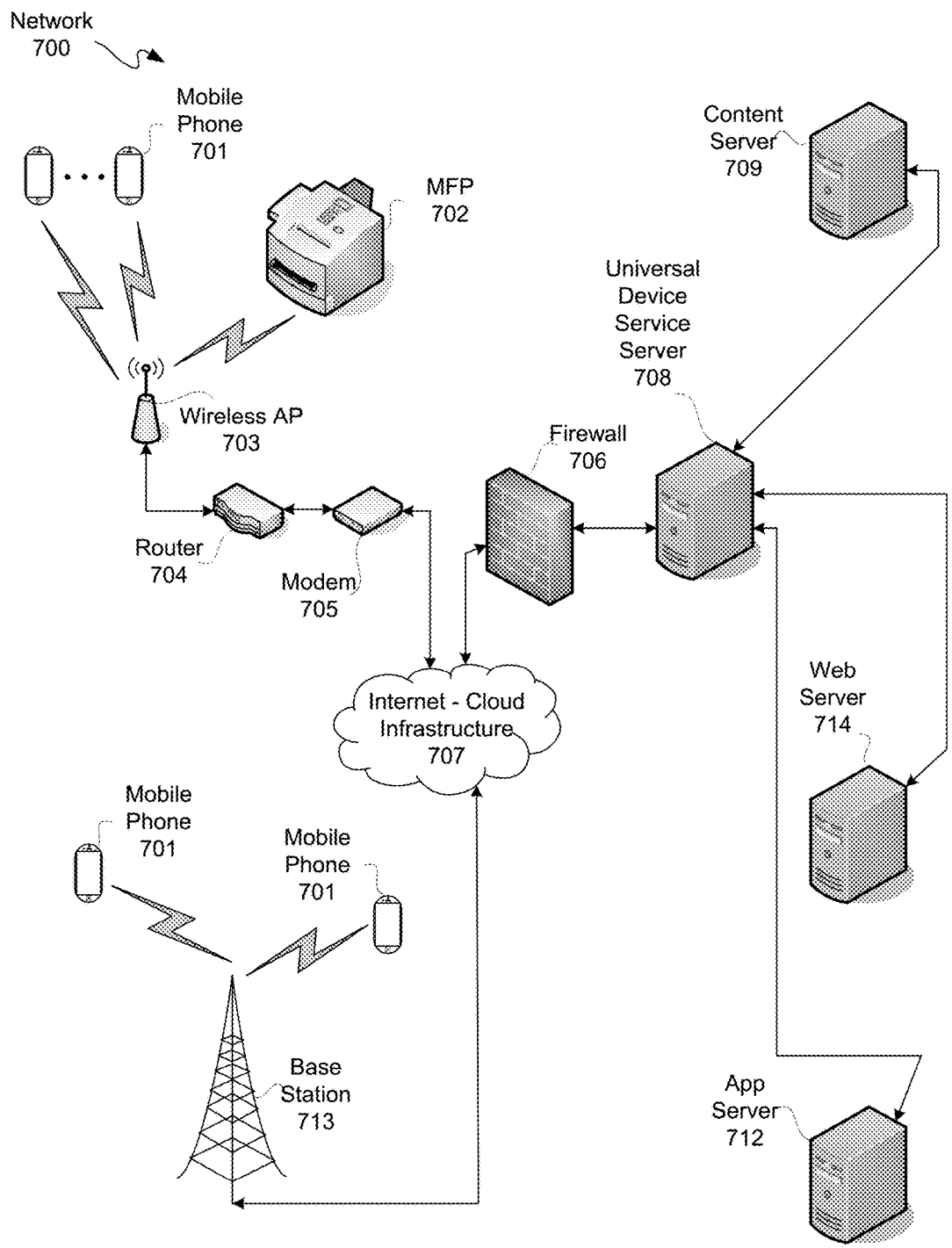
FIG. 7 is a pictorial diagram depicting an example network.

FIG. 7 is a pictorial diagram depicting an example network 700. Network 700 may include one or more mobile phones 701 in wireless communication with wireless access point ("AP") 703 and one or more mobile phones 701 in communication with a base station 713.

A MFP 702 may be in wireless communication with wireless AP 703. MFP 702 includes either a panel 100-1 or 100-2, as previously described. Wireless AP 703 may be connected for communication with a router 704, which in turn may be connected to a modem 705. Modem 705 and base station 713 may be in communication with the Internet-Cloud infrastructure 707.

A firewall 706 may be in communication with the Internet-Cloud infrastructure 707. Firewall 706 may be in communication with a universal device service server 708. Universal device service server 708 may be in communication with a content server 709, a web server 714, and/or an app server 712.

Figure 8:
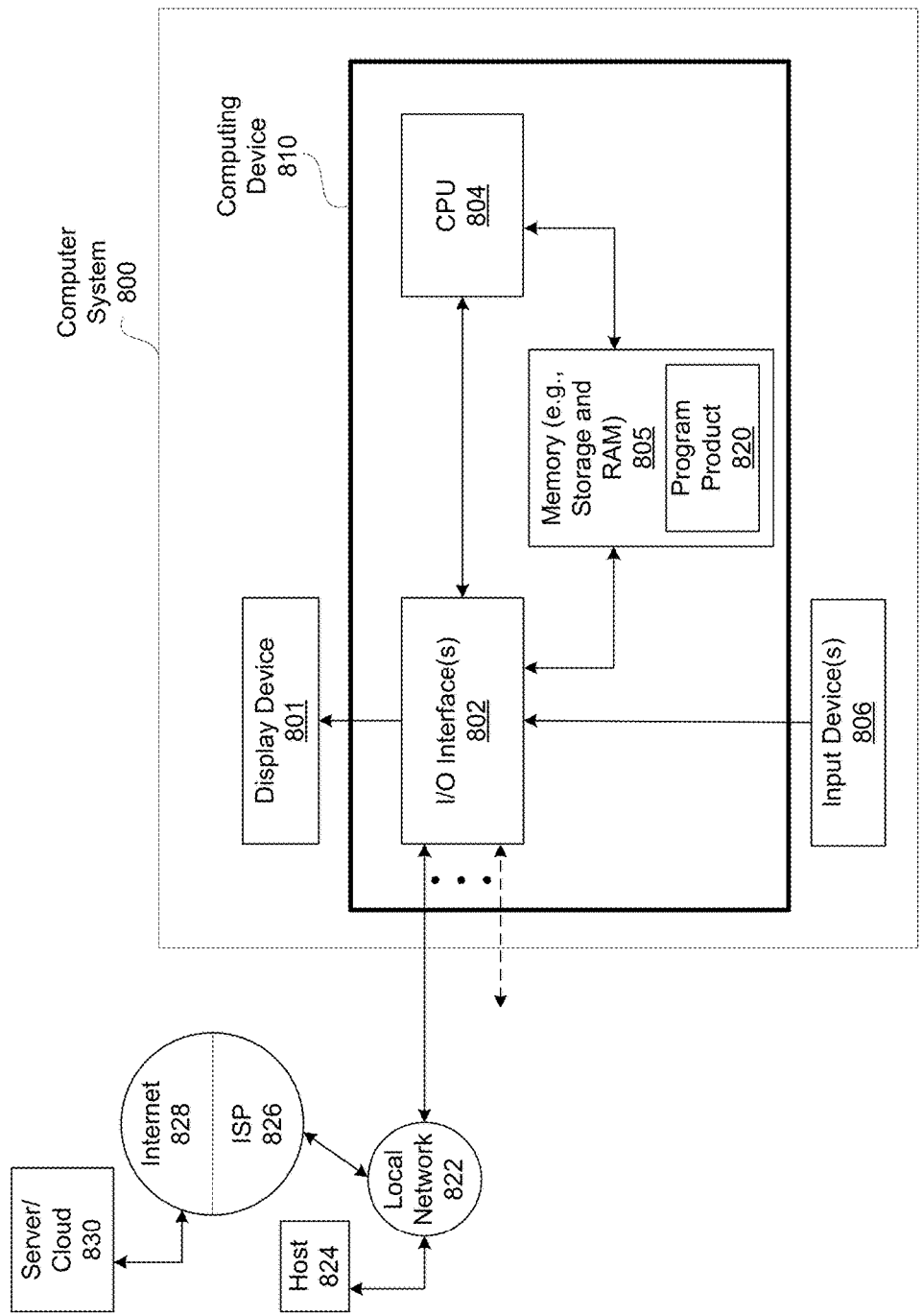
FIG. 8 is a block diagram depicting an example computer system.

FIG. 8 is a block diagram depicting an example computer system 800 upon which one or more aspects described herein may be implemented. Along those lines, an MFP, such as MFP 702, in effect may be a computer system, where a panel 100-1 or 100-2 thereof, is effectively a display device 801.

More generally, such a computer system 800 may include a programmed computing device 810 coupled to a display device 801, such as Liquid Crystal Displays ("LCDs"), Light Emitting Diode ("LED") displays, and to one or more input devices 806, such as a keyboard and a cursor pointing device. A cursor pointing device, such as a dial control 119 or 129, as previously described, may be used. Display 801 may be a touch screen display, as previously described. Computer system 800 by itself or networked with one or more other computer systems may provide an information handling system.

Programmed computing device 810 may be programmed with a suitable operating system, which may include Mac OS, Java Virtual Machine, Real-Time OS Linux, Solaris, iOS, Darwin, Android Linux-based OS, Linux, OS-X, Unix, or a Windows operating system, among other platforms, including without limitation an embedded operating system, such as VxWorks. Programmed computing device 810 includes a central processing unit ("CPU") 804, one or more memories and/or storage devices ("memory") 805, and one or more input/output ("I/O") interfaces ("I/O interface") 802.

CPU 804 may be a type of microprocessor known in the art, such as available from IBM, Intel, ARM, and Advanced Micro Devices for example. CPU 804 may include one or more processing cores. Support circuits (not shown) may include busses, cache, power supplies, clock circuits, data registers, and the like.

Memory 805 may be directly coupled to CPU 804 or coupled through I/O interface 802. At least a portion of an operating system may be disposed in memory 805. Memory 805 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 805 may include an SSD, which is coupled to I/O interface 802, such as through an SATA bus or other bus. Moreover, one or more SSDs may be used, such as for RAID or other multiple drive storage for example.

I/O interface 802 may include chip set chips, graphics processors, and/or daughter cards, among other known circuits. I/O interface 802 may be include interface circuitry adapted to receive and transmit data, such as data files and the like.

Programmed computing device 810 may optionally include one or more peripheral cards (not shown). An example of a daughter or peripheral card may include a network interface card ("NIC"), a display interface card, and a Universal Serial Bus ("USB") interface card, among other known circuits.

Programmed computing device 810 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 810. However, for purposes of clarity and not limitation, it shall be assumed that an SSD is housed in programmed computing device 810.

Memory 805 may store all or portions of one or more programs or data, including variables or intermediate information during execution of instructions by CPU 804, to implement processes in accordance with one or more examples hereof to provide program product 820. Program product 820 may be for implementing all or portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 810 for implementing techniques described herein may be performed by computing device 810 in response to CPU 804 executing one or more sequences of one or more instructions contained in main memory of memory 805. Such instructions may be read into such main memory from another machine-readable medium, such as a storage device of memory 805. Execution of the sequences of instructions contained in main memory may cause CPU 804 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 820, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 820. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 800, tangible machine-readable media are involved, for example, in providing instructions to CPU 804 for execution as part of programmed product 820. Thus, a programmed computing device 810 may include programmed product 820 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 804 for execution. For example, instructions may initially be carried on a magnetic disk or other storage media of a remote computer. The remote computer can load the instructions into its dynamic memory and send such instructions over a transmission media using a modem. A modem local to computer system 800 can receive such instructions on such transmission media and use an infra-red transmitter to convert such instructions to an infra-red signal. An infra-red detector can receive such instructions carried in such infra-red signal and appropriate circuitry can place such instructions on a bus of computing device 810 for writing into main memory, from which CPU 804 can retrieve and execute such instructions. Instructions received by main memory may optionally be stored on a storage device either before or after execution by CPU 804.

Computer system 800 may include a communication interface as part of I/O interface 802 coupled to a bus of computing device 810. Such a communication interface may provide a two-way data communication coupling to a network link connected to a local network 822. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 822 may provide data communication through one or more networks to other data devices. For example, a network link may provide a connection through local network 822 to a host computer 824 or to data equipment operated by an Internet Service Provider ("ISP") 826 or other Internet service provider. ISP 826 may in turn provide data communication services through a world-wide packet data communication network, the "Internet" 828. Local network 822 and the Internet 828 may both use electrical, electromagnetic or optical signals that carry analog and/or digital data streams. Data carrying signals through various networks, which carry data to and from computer system 800, are example forms of carrier waves for transporting information.

Wireless circuitry of I/O interface 802 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000, EV-DO, and LTE/LTE-Advanced) can be used depending on the type of communication or the range of the communication.

Computer system 800 can send messages and receive data, including program code, through network(s) via a network link and communication interface of I/O interface 802. In the Internet example, a server 830 might transmit a requested code for an application program through Internet 828, ISP 826, local network 822 and I/O interface 802. Received code may be executed by processor 804 as it is received, and/or stored in a storage device, or other non-volatile storage, of memory 805 for later execution. In this manner, computer system 800 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for operation of a multi-function printer panel, comprising:
   displaying a main menu on a display screen of the multi-function printer panel;
   navigating a plurality of primary image items of the main menu displayed on the display screen responsive to a first movement of a dial control;
   pressing the dial control to select a primary image item of the plurality of primary image items;

navigating a plurality of secondary image items displayed on the display screen associated with the primary image item selected responsive to a second movement of the dial control;

pressing the dial control to select a secondary image item of the plurality of secondary image items;

navigating to a height arrow image displayed on the display screen;

pressing the dial control to select the height arrow image;

shifting the dial control up or down to adjust a y-axis boundary;

navigating to a width arrow image displayed on the display screen by rotating the dial control;

pressing the dial control to select the width arrow; and shifting the dial control right or left to adjust an x-axis boundary.

2. The method according to claim 1, further comprising:

selecting use of the dial control of the multi-function printer panel over buttons of the multi-function printer panel; and pressing the dial control to display the main menu on the display screen.

3. The method according to claim 1, further comprising shifting the dial control in a first direction to return to the main menu or in a second direction different from the first direction to select a sub-menu screen image for display on the display screen associated with the secondary image item selected.

4. The method according to claim 1, wherein the first movement and the second movement of the dial control respectively includes a first and a second rotational movement of a circular knob.

5. The method according to claim 4, wherein the dial control includes a joystick interface knob for the circular knob.

6. The method according to claim 1, wherein the dial control includes a click wheel.

7. The method according to claim 6, wherein the first movement and the second movement of the dial control respectively include a first and a second sliding movement along a surface of the click wheel.

8. The method according to claim 1, wherein:
the primary image item is a scan image item; and
the secondary image item is a zoom item.

9. The method according to claim 8, further comprising:
navigating to a zoom arrow image displayed on the display screen;
pressing the dial control to select the zoom arrow image displayed; and
rotating the dial control in a first or a second rotational direction opposite the first rotational direction to zoom in or out, respectively.

10. The method according to claim 8, further comprising navigating to a zoom arrow image displayed on the display screen;
pressing the dial control to select the zoom arrow image displayed; and
shifting the dial control in a first or a second direction opposite the first direction to zoom in or out, respectively.

11. The method according to claim 10, wherein the navigating to the zoom arrow image includes rotating a knob of the dial control.

12. The method according to claim 10, wherein the navigating to the zoom arrow images includes sensing a tactile sliding movement along a surface of a click wheel.

13. The method according to claim 1, wherein:
the primary image item is a scan image item; and
the secondary image item is a scan size item.

14. The method according to claim 13, further comprising displaying on the display screen a predefined list of scan area sizes for selection responsive to size of a document on a platen of a multi-function printer having the multi-function printer panel.

15. The method according to claim 13, further comprising auto-determining scan boundaries of a document on a platen relative to platen dimensions for a multi-function printer having the multi-function printer panel.

16. A multi-function printer, comprising:
a multi-function printer panel having a display screen and a dial control;
the display screen configured to display a main menu responsive to pressing a dial control of the multi-function printer panel;
the dial control configured for navigating a plurality of primary image items of the main menu displayed on the display screen responsive to a first movement of the dial control;
the dial control configured for selecting a primary image item of the plurality of primary image items responsive to a depressing down of the dial control;
the dial control configured for navigating a plurality of secondary image items displayed on the display screen associated with the primary image item selected responsive to a second movement with respect to the dial control; and
the dial control configured for: selecting a secondary image item of the plurality of secondary image items responsive to a pressing down on the dial control;
navigating to a height arrow image displayed on the display screen;
pressing the dial control to select the height arrow image;
shifting the dial control up or down to adjust a y-axis boundary;
navigating to a width arrow image displayed on the display screen by rotating the dial control;
pressing the dial control to select the width arrow; and
shifting the dial control right or left to adjust an x-axis boundary.

17. The multi-function printer according to claim 16, wherein the dial control is configured with a knob for the first and the second movement respectively being a first and a second rotational movement of the knob.

18. A method for operation of a multi-function printer panel, comprising:
displaying a main menu on a display screen of the multi-function printer panel;
navigating a plurality of primary image items of the main menu displayed on the display screen responsive to a first movement of a dial control;
pressing the dial control to select a primary image item of the plurality of primary image items;
navigating a plurality of secondary image items displayed on the display screen associated with the primary image item selected responsive to a second movement of the dial control;
pressing the dial control to select a secondary image item of the plurality of secondary image items;
wherein the primary image item is a scan image item;
wherein the secondary image item is a scan area image item;
navigating to a y-axis arrow image displayed on the display screen by rotating the dial control;

selecting the y-axis arrow image by pressing the dial control;

adjusting a y-axis position by shifting the dial control up or down to move a vertical scan boundary;

navigating to an x-axis arrow image displayed on the display screen by rotating the dial control;

selecting the x-axis arrow image by pressing the dial control; and adjusting an x-axis position by shifting the dial control left or right to move a horizontal scan boundary.

19. The method according to claim 18, wherein:

the y-axis arrow image is a right y-axis arrow image;

the x-axis arrow image is a right x-axis arrow image;

the y-axis position is a right y-axis position;

the x-axis position is a right x-axis position; and the method further comprising:

navigating to a left y-axis arrow image displayed on the display screen by rotating the dial control;

selecting the left y-axis arrow image by pressing the dial control;

adjusting a left y-axis position by shifting the dial control up or down;

navigating to a left x-axis arrow image displayed on the display screen by rotating the dial control;

selecting the left x-axis arrow image by pressing the dial control; and adjusting a left x-axis position by shifting the dial control left or right.

\* \* \* \* \*